Nov. 17, 1959 H. NOYES ET AL 2,913,011
FLEXIBLE CONDUIT
Filed Oct. 1, 1956

INVENTORS
HOWARD NOYES
EDWARD M. ROTHERMEL
BY
Reuben Wolk
ATTORNEY

United States Patent Office 2,913,011
Patented Nov. 17, 1959

2,913,011

FLEXIBLE CONDUIT

Howard Noyes, Dayton, Ohio, and Edward M. Rothermel, Waynesville, N.C., assignors to The Dayton Rubber Company, Dayton, Ohio, a corporation of Ohio Application October 1, 1956, Serial No. 613,017

5 Claims. (Cl. 138—56)

The present invention relates to flexible conduits and particularly to conduits which are impervious to the passage of air or other fluids through its walls. Such conduits are therefore adapted for use in fluid transmission such as automotive cooling systems, vacuum cleaners and personal breathing equipment such as oxygen supply systems of the type commonly employed in high altitude aircraft. The conduits of the present invention are also reinforced against radial expansion and axial elongation as well as against radial collapse and may, therefore, be employed in pressurized fluid systems such as compressed air systems used in connection with aircraft personnel pressure suits which provide the vital atmospheric conditions surrounding the body of the wearer in the event of sudden exposure to the rare atmosphere of high altitudes. These conduits may also be employed in connection with such pressure suits to apply pressure at certain points of the human body to so retard and regulate the flow of blood as to prevent "blacking out" or similar undesirable physiological reactions to the extremes of high speed and high altitude flying.

In view of the extremely important nature of the fluids to be supplied by the conduits of the present invention, particularly where the same are employed in connection with the personal oxygen or pressure equipment above mentioned, it is absolutely essential that the conduits be reinforced against any radial collapse so that a constant and uniform supply of the fluid may be maintained. Moreover, since the conduits of the present invention will be involved in body movements, it is also essential that they be readily flexible; and toward this end, a corrugated or plicated conduit body has been found to be desirable. On the other hand, where the conduits are employed in pressurized suits and must supply a prompt and definitely controllable pressure, it is necessary that the conduits themselves should have little or no effect upon the flow characteristic of the pressurized fluid. This means that at least the fluid-contacting portion of the hose should be free from any obstructions and should therefore preferably be smooth or substantially cylindrical. Similarly the conduits must evince little or no reaction to the flow of the fluid; i.e., they should not expand radially or elongate axially under the influence of internal pressures.

Where conduits of the type of the present invention are to be associated with clothing or are to be carried by the human body, it is of course important that they be not only completely flexible to allow freedom of body movement but also very light in weight. The importance of light weight is increased in the case of aeronautical usage wherein weight per se is a vital factor.

A review of the foregoing requirements of conduits of the type considered herein and a review of the prior art relating to such conduits will disclose that certain of the desired properties have been hitherto achievable only at a considerable sacrifice of other of the desired properties. For example, in order to provide a conduit which is reinforced against radial expansion or contraction and axial elongation, it has been hitherto necessary to so buttress and reinforce the conduit that it would be excessively rigid, heavy and cumbersome for the above described applications. On the other hand, where the hose has been made to be flexible, its reinforcement, particularly against radial expansion and axial elongation, has been practically nil. The corrugation of the hose to enhance flexibility has also resulted in an irregular inner surface which deleteriously affected the flow of the fluids therein.

It is accordingly an object of the present invention to provide an improved circumferentially reinforced, flexible conduit.

It is a further object of the present invention to provide such a conduit which is so reinforced that an unrestricted fluid transmitting passage may be maintained therethrough notwithstanding the subjection thereof to collapsing forces or to extreme twisting or bending.

It is still a further object of the present invention to provide such a conduit which is also reinforced to the extent that it will not bulge, radially expand or axially elongate upon the sudden introduction into the passage thereof of a highly pressurized fluid.

It is a further object of the present invention to provide such a conduit which in addition to the foregoing properties will be extremely flexible and light in weight so that it may be intimately coordinated with movements of the human body and offer a minimum of hindrance thereto.

It is yet another object of the present invention to provide a conduit having a plicated or corrugated exterior surface for greater flexibity and a smooth, cylindrical interior surface for unrestricted fluid flow therewithin.

It is still a further object of the present invention to provide a method for the manufacture of such conduits.

In order to achieve these and other objects, advantages and improvements of the present invention to be apparent from the following description, it is proposed that a tubular body be composed of a substantially cylindrical tubular inner layer of elastomeric material, a first spring-like circumferential reinforcement of a resilient material having individual circumferential turns spaced axially of said body, a tubular layer of flexible material of relatively high tensile strength surrounding the inner layer and a second, outwardly disposed circumferential reinforcement of a flexible and substantially inextensible strand or cable wound about the layer of flexible, high tensile strength material between the individual turns of the first circumferential reinforcement. Thus the hose body of the present invention is seen to involve two circumferential reinforcements each comprising a series of axially spaced turns which are located at different parts of the body, the turns of one reinforcement being positioned between the turns of the other.

It has been found that light weight and flexibility may be achieved notwithstanding the presence of the two separate reinforcing components if the first is composed of spring wire or a similar resilient material and is of a relatively large cross sectional diameter and the second is in the form of a relatively non-resilient, non-elastic highly flexible cord or cable of high tensile strength and relatively small cross sectional diameter positioned exteriorly of the primary reinforcement. It has been found that particular improvements and advantages may be achieved if each of the reinforcement members is in the form of a spiral or helix of a continuous strand or cable.

Where the relative cross sectional diameters of the respective reinforcing strands or cables are as above described, it has been found that a substantially smooth, continuous and cylindrical inner conduit surface may be established and maintained even when the conduit is internally pressurized while the exterior surface of the conduit is plicated or corrugated to enhance the overall flexibility. These previously considered mutually exclusive features are thus achieved in a conduit, the wall of which is composed of integrated components which do not define voids or hollow passages in the wall which are subject to being punctured or torn open to destroy the fluid transmission utility of the hose. In the preferred embodiment of the hose so constructed, a second tubular layer of flexible material is placed about the exterior of the conduit assembly, which second layer is also corrugated and tightly embraces the previously assembled components so as to at least partially embed the turns of the secondary or outermost reinforcement. This association between the outermost elastomeric layer and the secondary reinforcement has been found to provide particular improvements in this type of hose in that the outer layer acts to flexibly but positively maintain the individual turns of the secondary reinforcement in their required axially spaced relation. At the same time, the outer layer protects the secondary reinforcement from abrasive damage or from being torn away from the hose body.

Where the cooperative primary and secondary reinforcements above described are so positioned in a hose body, it has been found that the reaction of the components is such that considerable stress is placed upon the hose body at the points of the termination thereon of the reinforcements, particularly the primary reinforcement composed of the resilient and relatively less flexible material such as spring wire. Accordingly, the present invention provides for chafing and cushioning components at the ends of the spring-like circumferential reinforcement which, in the case of the preferred helical spring, would be at the end-most turn or turns thereof.

In the construction or manufacture of the hose according to the present invention, an elastomeric tubular member is positioned about a rigid mandrel the outside diameter of which is substantially equal to the inside diameter of the tubular member. About the tubular member thus positioned upon the mandrel is positioned the first or primary circumferential reinforcement which, if it is in the form of a helical spring, may be merely slipped over the mandrel and inner layer and have its individual turns spaced longitudinally of the tubular member. To provide the relatively inextensible high tensile strength tubular layer about the exterior of the primary helical reinforcement, a strip or tape of the material such as a rubberized fabric may be continuously and spirally wrapped about the helical reinforcement allowing a small overlap at the edge of the strip being wound so that a continuous tubular cover will be provided. This spirally wrapped fabric tape is applied under tension so that it will firmly embrace the primary circumferential reinforcement and establish contact with the inner tubular layer through the spaced turns of the reinforcement. In making this contact, the layer of the fabric material will become slightly corrugated as it rises in passing over the reinforcing turns of relatively large cross sectional diameter and is depressed therebetween to establish contact with the tubular inner layer of the elastomeric material. About this fabric layer is wound the secondary reinforcement in the form of the flexible and inextensible cord or cable which may be of natural or synthetic textile fiber such as cotton, rayon or the like so that the individual turns thereof about the conduit thus far assembled will fall between the ridges created by the individual turns of the primary helical reinforcement. This secondary cord reinforcement may be applied by anchoring the cord at one of the conduit ends and then winding the same under tension spirally throughout the length of the hose and anchoring at its other end. The outer tubular elastomeric layer may then be radially expanded and placed around the fabric layer and the secondary reinforcement to firmly embrace these components upon its release from its expanded position. The components thus assembled may be integrated by suitable means; and, where the components are composed of a vulcanizable material such as any of the natural or synthetic rubbers or fabrics impregnated with such materials, satisfactory integration may be achieved by subjecting the assembly to vulcanizing conditions of heat and pressure. In order to protect the elastomeric and impervious tubular members from being punctured by the unique action of the primary reinforcement as it is influenced by the presence of the secondary cord reinforcement, chafer strips may be applied about the inner and outer peripheries of the primary reinforcement at its ends prior to the application of the fabric tubular layer. As additional protection against a rupture of the impervious conduit wall, a cushion strip may be provided about the outer periphery of the hose thus assembled in the vicinity of the ends of the primary reinforcement. In lieu of the outer elastomeric tubular layer surrounding the turns of the secondary reinforcement, a narrow strip of elastomeric material such as gum rubber may be wound around the secondary reinforcement at each end to anchor the end turns to the hose body.

Where the conduit of the present invention is to be employed in connection with fittings requiring a bushing or sleeve, this bushing or sleeve in the form of an elastomeric or other suitable material may also be applied at the ends of the principal conduit body before the same is subjected to integrating conditions. Where the sleeve as well as the remainder of the components are composed of a vulcanizable material, as stated above, the integration may be accomplished by vulcanization. In order to apply the necessary pressures to affect a thorough integration under vulcanizing conditions, the assembly constructed as described above may be compacted by wrapping the same with the spirally wound fabric tape known in the art as a "cross wrap" while the assembly is still on the rigid mandrel.

The invention thus generally described, its objects and advantages may be more clearly understood from a reading of the following detailed description of certain preferred embodiments thereof in connection with which reference may be had to the appended drawings.

Figure 1:
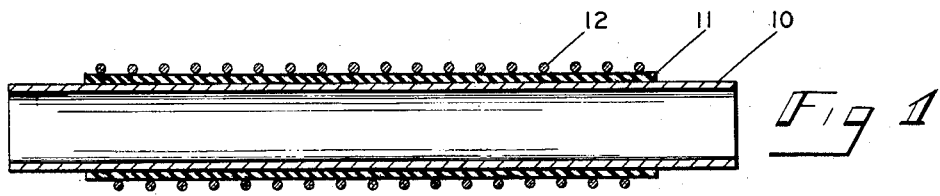
Figure 1 is a sectional view showing the mandrel, the inner tubular layer of elastomeric material and the primary circumferential reinforcement to be employed in one preferred embodiment of the present invention.

Referring now to Figure 1, the mandrel 10 may be simply a cylindrical or tubular piece of steel or other durable rigid material. While a satisfactory mandrel may be made of solid steel rod, it is usually more convenient to employ a hollow tubular member for the mandrel, especially where large diameter hoses are to be fabricated. About this rigid mandrel is placed the cylindrical tubular layer 11 of elastomeric material such as rubber, the various synthetic rubbers such as the polychloroprenes, the butadiene-acrylic nitrile copolymers, the butadiene-styrene copolymers, the polysulfide rubbers and the like. This tubular inner layer may be formed by processes of extrusion which are well known to the rubber and plastics industry; and, where this inner tubular layer is composed of a rubber or synthetic rubber material as shown in Figure 1, the same may be partially cured or vulcanized so as to give it sufficient substance to withstand the handling of manufacture. The inside diameter of the tubular layer 11 should preferably be substantially equal to the outside diameter of the cylindrical mandrel 10, and the tubular layer 11 is placed over the mandrel either by radially expanding the tube as in the case of a vacuum box well known in the hose or conduit manufacturing art or by stretching one end of the hose over the mandrel and applying compressed air to the remainder of the tube to radially expand the same to cause it to slip easily upon the mandrel.

Once the tubular layer 11 is positioned upon the mandrel, the preliminary circumferential reinforcement may be applied. In the preferred form herein described, this reinforcement comprises a helical spring 12 of resilient and only moderately flexible spring wire which is in the form of a cable or strand of such wire continuously wound in spiral fashion along the length of the layer 11 in individual turns which are spaced axially or longitudinally of the tubular layer and of the helix itself. One preferred method for applying such a helical reinforcement is to preform the spring wire into a helix which has an inside diameter substantially equal to the outside diameter of the tubular layer 11 as it is positioned upon the mandrel 10. The pre-formed helix may then be slipped over the tubular layer 11 and held or anchored at one end while the individual turns thereof are spaced axially of the tubular layer 11. During this operation, the helix will, of course be stretched or elongated and will embrace the tubular layer under tension.

In certain instances, particularly where it is contemplated that the finished conduit will be subjected to considerable flexing and twisting, it may be desirable to insure greater integration of the conduit components by applying a suitable adhesive such as a rubber or polychloroprene cement to the exterior surface of the tubular layer 11 before positioning the helix 12 therearound. Still greater integration may be effected if a similar cement is then applied to the exterior surface of the helical reinforcement 12 before the inextensible reinforcing fabric layer is applied thereto as shown in Figure 2.

Figure 2:
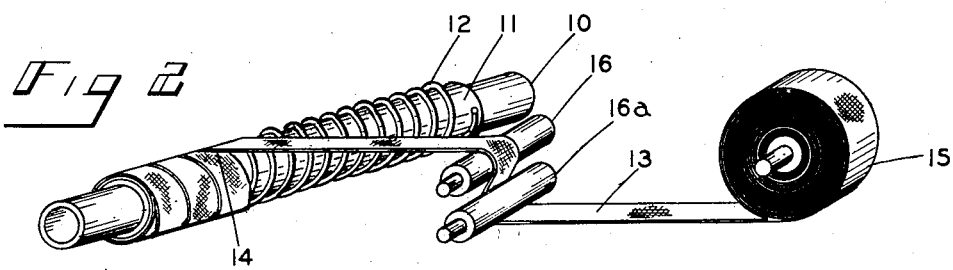
Figure 2 is a perspective view showing the manner in which the inextensible, high tensile strength reinforcing layer may be applied to the inner layer and circumferential reinforcement thereon.

Referring now to Figure 2, the mandrel 10, the inner tubular layer 11 and the circumferential reinforcing spring 12 are shown in perspective. With the spring 12 positioned upon the inner tubular layer 11 as shown, an inextensible reinforcing layer in the form of a textile fabric is wound about the previously assembled conduit components. This layer consists of a material which may be rubber coated or impregnated. While this inextensible reinforcing member may itself be in the form of a pre-formed tubular member, it has been found that the greatest reinforcing effect, particularly from the standpoint of inextensibility, may be achieved if the fabric is employed in the form of a fairly narrow strip or tape 13 which may be continuously wound in spiral fashion about the previously assembled conduit components. The tape is wound so that a repeated overlap will occur about the conduit as at 14, resulting in a continuous and uninterrupted reinforcing sleeve 13a. In order to insure complete integration of the components, it is preferred that this fabric strip or tape 13, which may be conveniently stored and handled in the form of the roll 15, be applied under slight tension which may be achieved by manipulation of the snubbing bars such as 16 and 16a as is well known in the art, or by other well known tensioning expedients.

Figure 3:
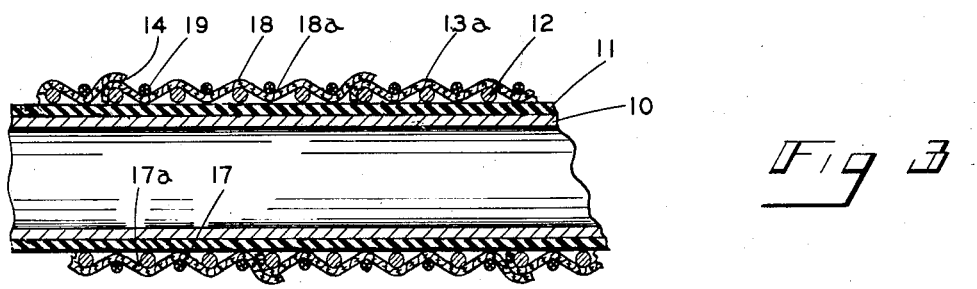
Figure 3 is a sectional view showing the arrangement upon a mandrel of the inner tubular layer, the primary circumferential reinforcement, the plicated inextensible reinforcing layer and the secondary reinforcement therearound.

The arrangement of the components thus far assembled is best shown in Figure 3 wherein the fabric strip 13 is shown to be positioned over the spring 12 and in contact between the spaced turns thereof with the inner tubular layer 11 still supported by the mandrel 10. The presence of the individual reinforcing turns spaced longitudinally of the assembly and the fact that the fabric strip 13 is wound therearound under tension will result in a tubular member which is internally and externally corrugated or plicated to provide internal crests 17, internal troughs 17a, external crests 18 and external troughs 18a. It will be noted that the plicated layer 13a contacts the inner layer 11, which remains substantially cylindrical in configuration, at points between the individual turns of the spring 12 and along the internal crests 17. The individual reinforcing turns on the other hand, occupy the internal troughs 17a.

Still referring to Figure 3, the external troughs 18a of the corrugated or plicated layer 13a are occupied by the flexible but inextensible secondary reinforcement or strand 19 which is preferably in the form of a continuous strand of a material such as a cotton cord or yarn or a cord or yarn of a similar textile or synthetic textile material such as rayon. This secondary reinforcement is wound about the previously assembled conduit components while they remain positioned upon the rigid mandrel 11 in a manner similar to that illustrated in Figure 2 in connection with the spiral application of the fabric strip 13. As in the case of this fabric strip, the strand 19 is preferably wound under tension provided by snubbing bars similar to 16 and 16a of Figure 2 or by other well known tensioning devices so that the cord will firmly embrace the fabric layer 13a. Since the secondary reinforcing strand 19 is of a non-resilient nature and is readily flexible, it may not be conveniently pre-formed into a spring similar to the spring 12. As a result, it is necessary that this secondary reinforcement be applied as a continuous strand at the time of its final association with the conduit. In order that the spiral winding may be satisfactorily effected, it is necessary that the end of the strand be anchored at a point at the end of the hose body as defined by the primary helical reinforcing coil and then be spirally wrapping throughout the length of the body to the other end of the reinforcing coil, there again to be anchored. Suitable anchoring may be achieved by applying a cement to the end of the cord or merely by tying the same in a loop about the cylindrical construction.

Figure 4:
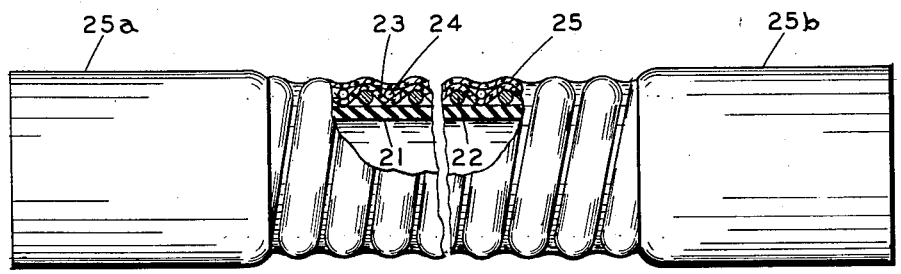
Figure 4 is an elevational view in partial cross-section showing a preferred conduit in accordance with the present invention.

In Figure 4, a completed form of the conduit includes the basic structure described above, comprising inner layer 21, the primary spring-type reinforcement 22, the corrugated tubular reinforcing layer 23 thereover and the secondary strand type reinforcement 24 positioned in the external troughs of the corrugated layer as shown in the basic structure described in connection with Figures 1 through 3. In the particular embodiment illustrated in Figure 4 however, an additional outer tubular layer 25 of an elastomeric material similar to that of the inner layer is positioned exteriorly of the components assembled as previously described. This layer, like the layer formed by the winding of the fabric strip 13, will be influenced by the positioning and relative diameters of the primary and secondary reinforcements to be plicated or corrugated so that its exterior crests and troughs overlie and register with the similar crests and troughs of the corrugated layer 23. In addition to providing a protective outer covering and preventing the windings of the secondary strand type reinforcement 24 from becoming damaged or dislodged, it will be observed that this outer layer 25 partially embraces each of the windings of the secondary reinforcement 24 so that said turns may be said to be partially embedded therein. The result of this intimate association between the secondary reinforcement and the outer tubular layer 25 is that the individual turns of the secondary reinforcement are firmly held in their desired axially spaced relationship and will therefore always be in a position to preserve the corrugation of the intermediate layer 23 and the desired axial spacing of the individual turns of the primary reinforcement regardless of the extremes of flexing, twisting or stretching to which the conduit may be subjected. At the ends of the conduit the sleeves 25a and 25b are added. The construction of these sleeves will be more fully described in conjunction with Figure 5.

Figure 5:
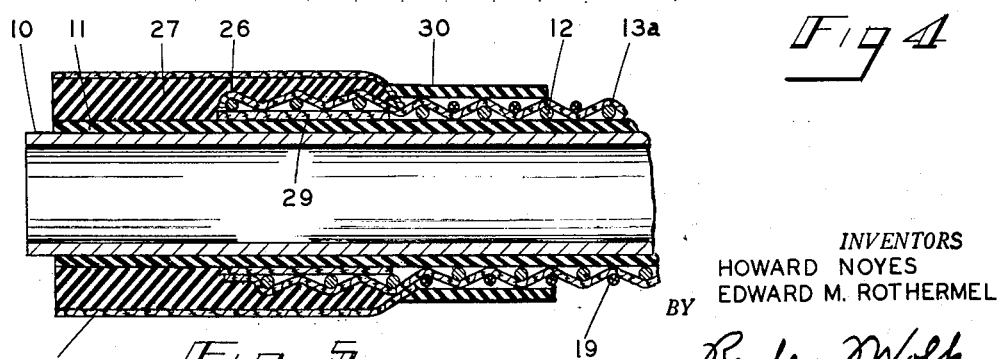
Figure 5 is a sectional view showing the arrangement of the various components of a modification of the invention.

Referring now to Figure 5, a modified form of the invention is shown, illustrating refinements of the relation among the components. It can be seen that the hose body termintes at end 26 of the primary helical reinforcing spring 12. The inner tubular layer 11 may extend beyond this end. The layer 13a is coextensive with the spring 12 and terminates at the last or endmost helix 26 thereof. On the other hand, the secondary strand type circumferential reinforcement 19 may terminate short of the end of the hose body at a point to be defined by the inwardly or centrally disposed end of the subsequently added sleeve or bushing 27. The last turn or winding of the strand type reinforcement 19 is merely looped about the cylindrical body and tied in any of the conventional knots to secure the strand in its desired position throughout the length of the hose body. In order to more firmly anchor this binding and to protect the same from becoming removed or damaged as a result of abrasive wear, the point at which the strand 19 is anchored may be further protected by winding therearound a strip 30 of a cushion material such as the elastomeric material above described in the case of the inner tubular layer 11. It should be noted that if an outer tubular layer such as the one designated as 25 in Figure 4 is employed, the cushion strip may not be needed because the outer tubular layer will act as an anchor to maintain the desired engagement of the secondary reinforcement about the plicated layer.

The basic construction of the hose above described may be modified where it is desired that the conduit be employed in connection with fittings requiring a bushing or sleeve such as that shown as 27 in Figure 5. This bushing or sleeve is usually composed of a deformable elastomeric material of the type above described and is usually of a relatively greater thickness than the remainder of the conduit body in order to act as an adapter for a fitting of larger diameter. Where such a sleeve is desired, the same may be conveniently provided by preforming the same in the form of a tube and merely slipping this tubular member over the end of the hose as it is defined by the end of the primary helical reinforcement. Where a fabric or other abrasive resistant covering such as 28 is desired about this sleeve or bushing, the same may be provided after the bushing 27 is positioned on the mandrel by a winding in the form of a separate width of a rubberized fabric or like material about the bushing. This exterior fabric may however, be merely an extension of the windings of the fabric strip 13 forming the intermediate corrugated tubular layer of the hose body. In the embodiment illustrated in Figure 5 however, the fabric is separately applied while the corrugated reinforcing layer 13a is allowed to extend past the inner-most end of the sleeve to the end 26. This construction not only provides for a greater integration of the sleeve 27 with the hose body proper as it is defined by the extremities of the primary reinforcement 12 but also acts as a reinforcement to prevent a concentration of flexing at the point of the juncture between the sleeve and the hose body. This extension of the layer 13a over the endmost turn of the primary reinforcement also serves as a chafer or protective strip which has been found important in the case of hoses according to the present invention wherein the end of the primary reinforcement is subject to certain movements and tends to puncture or tear through the hose wall. To provide this same type of protetcion inwardly of the primary reinforcement 12, a second tear-resistant chafer strip 29 of a similar fabric which may be coated or impregnated with an elastomeric material may be provided about the inner periphery of the primary reinforcement 12 about its endmost turns.

In the sequence of operations in the construction of the hose of the type having an end portion as illustrated in Figure 5, the inner tubular layer 11 is first positioned upon the rigid cylindrical mandrel 10. The points on this inner tubular layer which will underlie the endmost turns of the primary reinforcement 12 are then provided with one or more windings of the chafing fabric 29. The helical reinforcement 12 is then applied to the inner tubular layer in the manner above described with the ends of the reinforcement positioned over the chafer strip 29. The fabric strip 13 is then wound under tension about the primary reinforcement thus positioned upon the assembly to result in the corrugated, relatively inextensible reinforcing layer 13a. The winding of the fabric strip in the formation of this layer is about the entire length of the helical reinforcement 12 so that the endmost windings of the fabric tape 13 will provide the chafing strip or material along the outer periphery of the reinforcement in the vicinity of its ends. The tubular end sleeves or bushings 27 are then slipped over the ends of the hose body proper as it is defined by the ends of the primary reinforcement. The secondary strand type reinforcement 19 is then wound about the hose body up to the point thereon where the inwardly disposed end of the sleeve 27 is positioned. The strand or cable forming this secondary reinforcement is anchored to the hose body at the end of its winding in the above described manner. The fabric covering 28 may then be applied about the outer periphery of the sleeve by winding therearound a strip of such fabric the width of which may be equal to the length of the sleeve and even greater so that the covering will extend beyond the inwardly disposed end of the sleeve and contact the corrugated fabric layer 13a. About the point of anchorage of the strand reinforcement 19 at its endmost turn may be applied the protective and integrating strip 30 of rubber. This strip, as shown in Figure 5, overlaps the inwardly disposed end of the sleeve 27 and/or the fabric cover 28 therearound. The components thus assembled may be subjected to the conditions of heat and pressure as above described to be properly integrated. It is to be understood that in the assembly of the components as described above, well known adhesive or bonding agents may be employed between the various laminations to enhance the integration of the vulcanizable materials shown or to provide such integration where vulcanization may not be relied upon for example, where non-vulcanizable material such as the various organic plastic materials such as polyvinyl chloride, cellulose acetate and the like form such components.

As stated above, it is important that the relative thicknesses and diameters of the conduit components, particularly the reinforcements thereof, be carefully determined and controlled. This is necessary in order to provide a smooth inner surface and external corrugation. It has been found further that a careful determination and control of the relative diameters of the tubular members of the conduit body will result in improved integration for longer life and improved strength and flexing characteristics. The cross sectional diameter of the primary spring-like reinforcement should be relatively large as compared with the cross sectional diameter of the strand or cable forming the secondary reinforcement. It has been found that the preferred range of the ratio of the diameter of the primary reinforcement to that of the secondary reinforcement is approximately 2 to 1. It has been found further that, while the inside diameter of the inner tubular layer should be substantially equal to the outside diameter of the mandrel on which it is to be positioned in the manufacturing process, the inside diameter of the primary helical reinforcement should be slightly less than the outside diameter of the inner tubular layer about which it is positioned. Similarly, the inside diameter of the outer elastomeric tubular layer such as 25 in Figure 4 should be less than the outside diameter of the primary helical reinforcement.

One preferred hose suitable for use in connection with the above described pressurized suits for controlling the flow of blood in the human body consists of an inner tubular layer having an inside diameter of 5/8" and a wall thickness of .032". The primary helical reinforcement has a cross sectional diameter of .044" and has its individual turns spaced by a distance of 9/32" axially of the conduit. The outer tubular layer such as 25 in Figure 4 has an inside diameter of 3/4" and a wall thickness of .025". The secondary reinforcement, being spaced intermediately of the turns of the primary reinforcement has therefore, its individual turns spaced by the same 9/32" axially of the hose. The secondary reinforcement is in the form of a strand of rayon cord having a cross sectional diameter of .020".

While the present invention has been described in particular detail in connection with certain preferred embodiments thereof, the particularization has been for purposes of description and illustration only and does not limit the scope of the invention as it is defined in the subjoined claims.

We claim:

1. A flexible conduit comprising a smooth-surfaced tubular inner layer of elastomeric material, a plurality of turns of a reinforcing wire helix in radial contact with and longitudinally spaced along said inner layer, a plicated tubular outer layer of rubberized fabric overlying said wire turns and contacting said inner layer therebetween, and an inextensible strand engaging said outer layer under tension between the turns of said wire, said wire terminating short of the ends of the said conduit as defined by said inner and outer layers and having an inner and outer rubberized fabric strip engaging said helix at each end thereof, said helix retained in its longitudinal spacing.

2. A flexible conduit having a circumferentially reinforced body and a deformable sleeve integrally associated with at least one of the ends thereof, said body comprising a cylindrical inner layer of elastomeric material, a helical reinforcing wire contactingly surrounding and having its individual helices spaced longitudinally along and terminating short of the ends of said inner layer, a plicated outer layer surrounding said helices and contacting said inner layer therebetween, an inextensible cord of relatively small diameter wound spirally about said outer layer between said helices, a fabric strip contacting each of the inner and outer peripheries of the helix adjacent the ends thereof, and a deformable sleeve surrounding the inner layer and the fabric covered portion of the helix, said helix retained in its longitudinal spacing.

3. A flexible conduit according to claim 2 wherein a strip of elastomeric material surrounds said body and embeds at least one end of said cord.

4. A flexible conduit according to claim 2 wherein a continuous plicated tubular layer of elastomeric material surrounds said body and said sleeve and embeds said cord.

5. A flexible, fluid impervious, circumferentially reinforced conduit comprising a cylindrical inner layer of elastomeric material, a helical reinforcing spring of resilient material surrounding and contacting said inner tube and having the individual helices thereof spaced axially of said tube, a fabric chafing strip about the inner and outer peripheries of said helical spring at at least one end thereof, an elastomeric cushion strip surrounding the fabric chafing strip about the outer periphery of said helical spring at at least one end thereof, a spirally wrapped rubberized fabric tape about said helical spring throughout its entire length maintaining said spring in its longitudinal spacing, a textile cord spirally wound about said spirally wrapped fabric tape and engaging the same under tension at points between the axially spaced helices of said helical spring, and a plicated outer tubular member of elastomeric material surrounding said spirally wrapped fabric tape and said textile cord wherein said outer tubular layer engages said inner layer along the path defined by the said helical spring and at least partially encases said textile cord.

References Cited in the file of this patent

UNITED STATES PATENTS

| | | |
|---|---|---|
| 2,176,762 | Forbes | Oct. 17, 1939 |
| 2,321,064 | Broedling | June 8, 1943 |
| 2,396,059 | Roberts | Mar. 5, 1946 |
| 2,430,081 | Roberts et al. | Nov. 4, 1947 |
| 2,508,774 | Roberts | May 23, 1950 |
| 2,550,099 | Roberts | Apr. 24, 1951 |
| 2,584,501 | Roberts | Feb. 5, 1952 |
| 2,597,806 | Martin | May 20, 1952 |
| 2,641,301 | Gerber et al. | June 9, 1953 |